United States Patent
Bloss et al.

[11] Patent Number: 5,670,880
[45] Date of Patent: Sep. 23, 1997

[54] APPARATUS FOR TESTING MAGNETIC PROPERTIES OF SHEET MATERIAL SUCH AS BANK NOTES OR PAPERS OF VALUE

[75] Inventors: Michael Bloss, München; Dieter Stein, Holzkirchen, both of Germany

[73] Assignee: Giesecke & Devrient GmbH, Munich, Germany

[21] Appl. No.: 587,899

[22] Filed: Jan. 16, 1996

[30] Foreign Application Priority Data

Jan. 17, 1995 [DE] Germany .................. 195 01 245.3

[51] Int. Cl.$^6$ .................. G01R 33/12; G06K 7/08
[52] U.S. Cl. .................. 324/262; 235/449
[58] Field of Search .................. 324/262, 260, 324/210; 235/449; 209/562, 567, 569; 194/317, 319, 320

[56] References Cited

U.S. PATENT DOCUMENTS

| | | | |
|---|---|---|---|
| 3,218,440 | 11/1965 | Albosta | 235/449 |
| 4,181,920 | 1/1980 | Cerekas | 235/449 |
| 4,584,529 | 4/1986 | Aoyama | 324/262 |
| 4,916,295 | 4/1990 | Chominski | 235/449 |
| 5,473,147 | 12/1995 | Hoshino et al. | 235/449 |

FOREIGN PATENT DOCUMENTS

| | | |
|---|---|---|
| 295229 | 12/1988 | European Pat. Off. . |
| 589195 | 3/1994 | European Pat. Off. . |
| 1953542 | 5/1971 | Germany . |

*Primary Examiner*—Sandra L. O'Shea
*Assistant Examiner*—Roger Phillips
*Attorney, Agent, or Firm*—Anderson Kill & Olick P.C.

[57] ABSTRACT

For measuring magnetic properties of sheet material the sheet material is guided past a magnetic measuring system at a measuring distance defined between the sheet material and the magnetic measuring system. The sheet material is transported with a transport medium disposed between the measuring system and the sheet material. The measuring distance is determined substantially by the thickness of the transport medium. The thickness of the transport medium is selected to be smaller than a predetermined local resolution. If the local resolution is high enough it is also possible to detect magnetic printed images.

9 Claims, 2 Drawing Sheets

APPARATUS FOR TESTING MAGNETIC PROPERTIES OF SHEET MATERIAL SUCH AS BANK NOTES OR PAPERS OF VALUE

FIELD OF INVENTION

This invention relates to an apparatus for testing magnetic properties of sheet material such as bank notes or papers of value according to the preamble of the main claim.

BACKGROUND OF THE INVENTION

For producing magnetic properties the sheet material is generally provided with permanent-magnetic or soft-magnetic particles. These magnetic particles are incorporated directly in the sheet material during production of the sheet material, e.g. as a safeguarding thread or in statistical distribution, or else applied to the sheet material later, e.g. in the form of magnetic ink. With magnetic ink one can produce for example simple codes or even complicated printed images.

For measuring the magnetic properties the sheet material is guided past a magnetic measuring system at a measuring distance defined between sheet material and measuring system. The measuring system detects the magnetic properties of the sheet material and transmits the detected signals to an evaluation unit. Using the detected signals the evaluation unit can for example test the authenticity of the sheet material by comparison with internally stored reference patterns.

An apparatus of the above type for testing sheet material with magnetic properties is known for EP 0 467 202. This publication specifically describes different measuring systems which can be composed either of one sensor or of several sensors. The measuring systems shown are designed so that they test articles with low remanence in the sheet material with sufficient reliability.

Further it shows how to select the dimensioning of sensors within a measuring system in order to attain a predetermined local resolution (here and throughout the specification "resolution" defines "a measure of a smallest area detectable by a measurement system in an image printed on a paper sheet with magnetic properties"). For a magnetic printed image to be recognized on sheet material the local resolution should be about 1 mm in the direction of transport of the sheet material as well as perpendicular thereto. To attain such high local resolution it is necessary for the measuring distance to be about half as great as the desired local resolution.

A transport apparatus which guides the sheet material past the measuring system at the defined measuring distance is not described.

EP 0 057 520 describes an assembly of the above type, dealing substantially with detection of safeguarding threads incorporated in the sheet material. It shows not only the design of the magnetic measuring system but also various possibilities for transporting the sheet material.

In one embodiment the sheet material is clamped between straps for transport and transported to the measuring system. Before the measuring system the bank note leaves the strap system and is urged onto the measuring system by a pressing spring. After the sheet material passes through the measuring system it is grasped by a further strap system and conveyed further. The dimensioning of the strap systems is selected so as to guarantee transport of the sheet material at all times.

This apparatus is disadvantageous in that the sheet material is urged directly onto the measuring system. This can readily cause the measuring system to be damaged by abrasion. Furthermore the measuring system can be damaged by the surface roughness of the sheet material or any pins or clips or other hard objects sticking to the sheet material.

A further possibility for transporting the bank note is to clamp it between straps again and transport it past the measuring system in this clamped state. The disadvantage of this apparatus is that the elasticity of the transport straps causes fluctuations in the measuring distance. In the areas where the sheet material is not clamped by the straps the ambient air additionally causes the sheet material to flutter, which again causes fluctuations in the measuring distance. It is not possible here to test sheet material with high local resolution since the magnetic measurements are dependent on the measuring distance.

OBJECTS OF THE INVENTION

The object of the invention is to propose an apparatus for testing magnetic properties of sheet material permitting magnetic structures to be detected in high local resolution.

SUMMARY OF THE INVENTION

This object is achieved, according to the invention, by features stated in the characterizing part of the main claim.

The basic idea of the invention is to transport the sheet material with a transport medium which is disposed between the measuring system and the sheet material. The measuring distance defined between sheet material and measuring system is determined substantially by the thickness of the transport medium. The thickness of the transport medium is selected to be smaller than the predetermined local resolution. It is thus possible to guide the sheet material past the measuring system at a defined measuring distance which is smaller than the predetermined resolution. The measuring distance is preferably selected to be smaller than or equal to one half of the predetermined resolution.

Advantages of this solution are that there is no direct mechanical interaction between sheet material and measuring system. It avoids wearing problems due to abrasion by the sheet material or by hard objects accompanying the sheet material. It permits the measuring distance to be kept small and simultaneously constant so that the sheet material can be tested with high local resolution.

The following measures can be taken to adapt the basic idea of the invention to specific requirements.

If the thickness of the transport medium is selected to be equal to the measuring distance the transport medium and measuring system touch each other. The wear can be minimize here if the transport medium and measuring system have a low coefficient of friction. The pairing of transport system and measuring system thus causes the same components always to rub. The low coefficient of friction between the components and the pairing of the components guarantee a long service life of the components.

The width of the transport medium can be selected to be equal to the width of the measuring system so that the measuring system is covered completely by the transport medium. Testing of the sheet material takes place through the transport medium. The measuring system is thus protected additionally by the transport medium and fluttering of the bank note is avoided since the sheet material is guided reliably over the entire width of the measuring system.

If the width of the measuring system is selected to be equal to the width of the sheet material, the sheet material can be tested all over.

In a first embodiment the inventive transport medium consists of a rotating drum, the sheet material being guided on the outside of the drum and the measuring system being located in the interior of the drum. Due to the geometry of the drum the thickness of the drum can be selected to be very small without losing the rigidity necessary for transport. For very high local resolutions it is furthermore possible to design the measuring system to rub with the drum. The measuring distance is then equal to the thickness of the drum. By a suitable design with a low coefficient of friction between the components one can attain almost wear-free contact between measuring system and drum.

In a further embodiment the transport medium is designed as a transport band. To minimize variation of the measuring distance due to the elasticity of the transport strap, the latter is preferably guided fractionally over the measuring system. The maximum variation in distance can be adjusted by the pressing force between strap and measuring system. A low coefficient of friction between the components reduces wear and increases the service life of the components.

BRIEF DESCRIPTION OF THE DRAWINGS

Further advantages and developments of the invention can be found in the subclaims and the following description of embodiments with reference to the figures, in which:

DESCRIPTION OF THE PREFERRED EMBODIMENT

Figure 1:
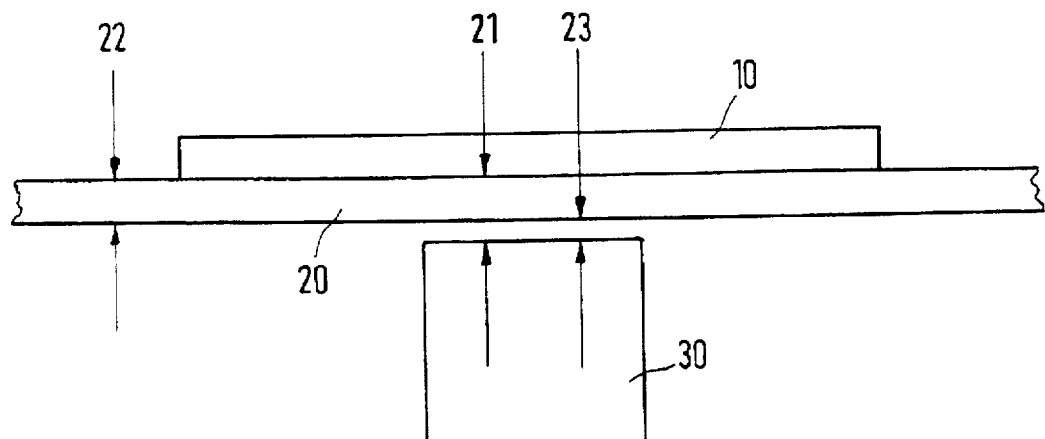
FIG. 1 shows a schematic diagram of the invention.

With reference to FIG. 1 the principle of the invention will first be explained. Sheet material 10 is located on transport medium 20. Under transport medium 20 magnetic measuring system 30 is mounted. Transport medium 20 covers measuring system 30 in its entire width. For all-over testing of sheet material 10 the width of measuring system 30 is selected to be equal to the width of sheet material 10. The testing of sheet material 10 by measuring system 30 takes place through transport medium 20.

Measuring distance 21 is defined as the distance between sheet material 10 and measuring system 30. It is determined substantially by thickness 22 of the transport medium. If thickness 22 is smaller than measuring distance 21, gap 23 arises between transport medium 20 and measuring system 30. The upward limit of transport medium thickness 22 is given by measuring distance 21. If Transport medium thickness 22 is equal to measuring distance 21, gap 23 disappears and transport medium 20 touches measuring system 30. The friction arising from contact between transport medium 20 and measuring system 30 can be minimized by an accordingly designed friction pairing with a low coefficient of friction.

Minimum friction between the components and thus also minimum wear of the components can be attained on one hand by a very hard surface of the measuring system. Suitable surface materials are for example thin layers such as TiC or TiN, diamond, ceramics, hard chromium or sprayed layers of e.g. tungsten carbide, $Al_2O_3$, TiC, carbon or molybdenum. On the other hand the side of the transport medium facing the measuring system can be equipped with a wear-reducing surface. A suitable material here is for example a plastic coating with teflon or a fabric compound with wear-resistant fibers, such as glass fibers, carbon fibers or Kevlar fibers.

Figure 2:
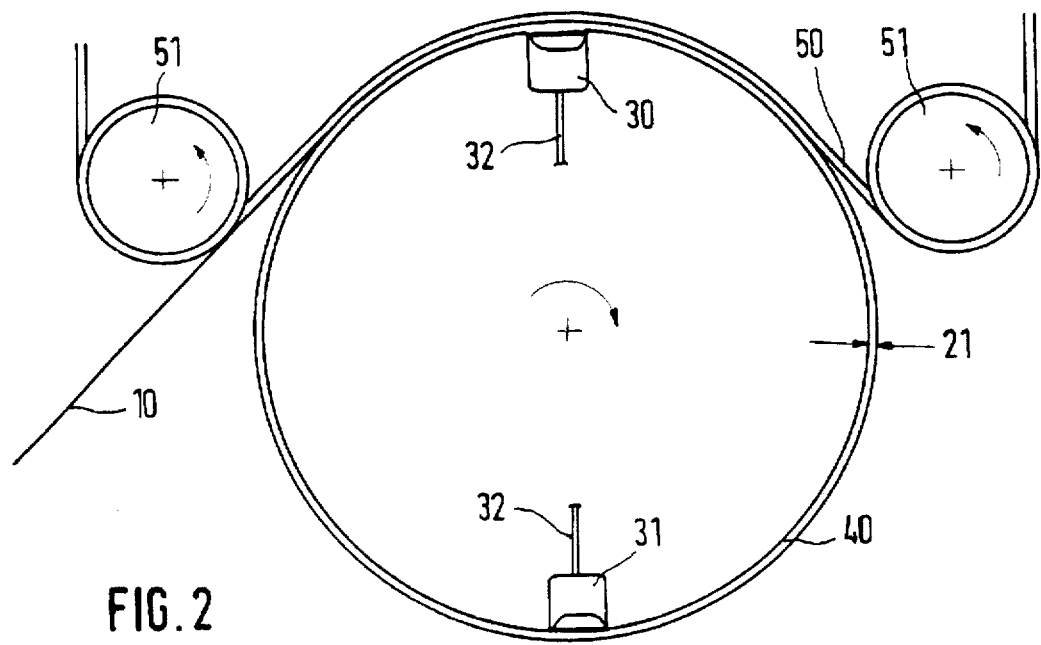
FIG. 2 shows a side view of a first embodiment with a drum.

FIG. 2 shows a side view of a first embodiment in which the transport medium is designed as drum 40. In the embodiment shown here, measuring system 30 is connected fractionally with drum 40. Transport medium thickness 22 is thus equal to measuring distance 21. A pressing system consisting of pressing band 50 and two deflecting rolls 51 is preferably provided in addition to drum 40. The pressing system serves to urge sheet material 10 onto drum 40 so that fluctuations of measuring distance 21 due to the waviness of the sheet material are virtually avoided in the area of measuring system 30. The width of pressing band 50 is preferably selected to be at least equal to that of transport medium 20.

To permit detection of magnetic soiling of drum 40 it is possible to take reference measurements with measuring system 30 in the gap between two sheets. Second measuring system 31 can optionally also be provided, being placed so as to receive no signals from the sheet material and thus serve only to monitor the magnetic soiling of drum 40.

The signals detected by the measuring systems are transmitted by supply lines 32 to an evaluation unit not shown here, which then performs the testing of the sheet material using the measured signals.

Figure 3:
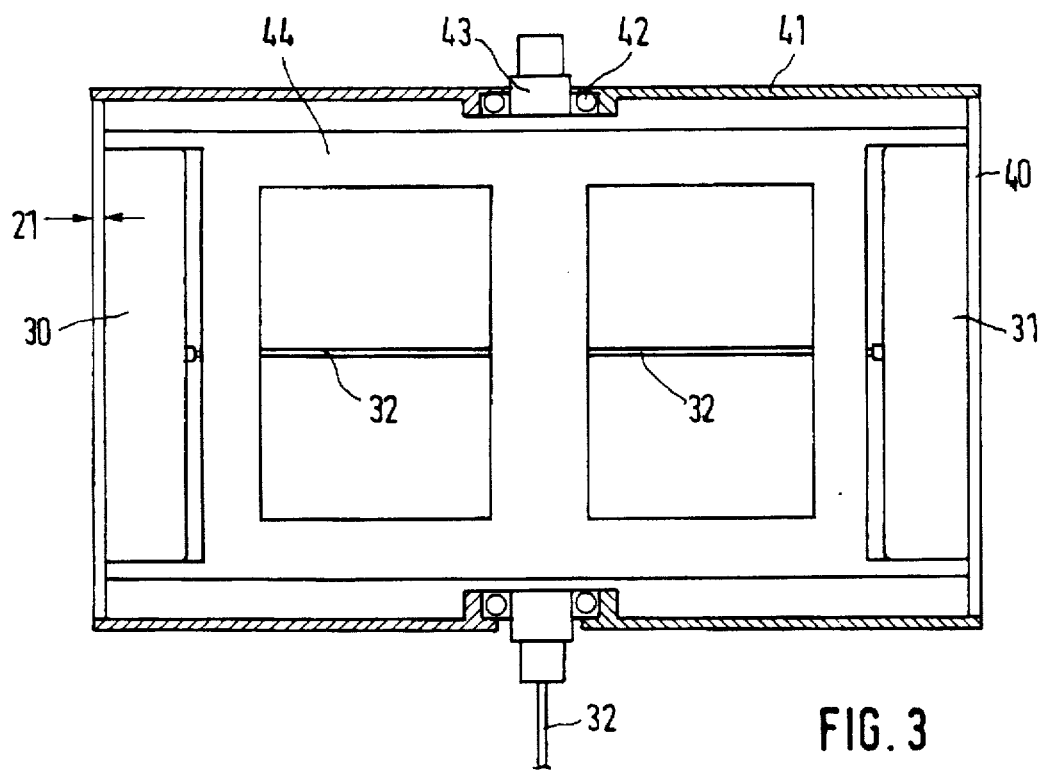
FIG. 3 shows an interior view of the drum.

FIG. 3 shows an interior view of drum 40. Drum 40 is stabilized and held in position with the help of drum walls 41. Drum walls 41 are connected via drum bearings 42 with stationary drum axle 43 so that drum 40 can rotate around axis 43. Drum 40 contains stationary measuring system holder 44 connected with drum axle 43. Fastened to measuring system holder 44 are measuring system 30 and optional measuring system 31. Supply lines 32 are guided outward through drum axle 43.

The drive means for drum 40 are omitted here for reasons of clarity. There are several possibilities for the drive. on one hand the drive of drum 40 can be realized by a moving strap driving drum 40 on the periphery, or it can be driven directly by a speed-controlled motor. Alternatively drum 40 can be driven on its periphery by a driven transport cylinder of the transport system connected with the periphery of drum 40 via a friction clutch.

Figure 4:
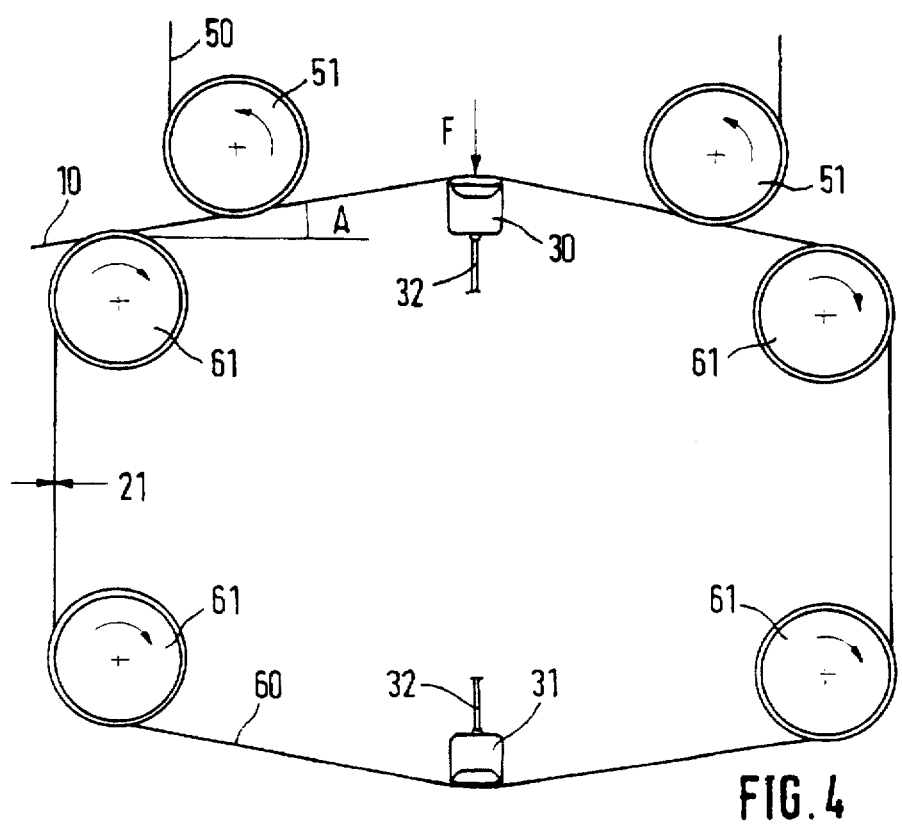
FIG. 4 shows a side view of a second embodiment with a transport band.

FIG. 4 shows a side view of a further embodiment in which the transport medium is designed as transport band 60. Transport band 60 is driven and guided by deflecting rolls 61. As in the first embodiment a pressing system consisting of pressing band 50 and two deflecting rolls 51 is also provided here. Sheet material 10 is guided between transport band 60 and pressing band 50. The thickness of transport band 60 corresponds to measuring distance 21, resulting in a friction pairing between transport band 60 and measuring system 30.

In order to minimize variations of measuring distance sell due to the waviness of sheet material 10 or the elasticity of transport band 60, the sheet material is urged onto measuring system 30 with force F. Force F is fixed by the choice of angle A. At small angles A this force is very small, increasing as this angle increases.

In this embodiment optional measuring system 31 is also provided for detecting magnetic soiling of transport band 60.

In a development of the invention not shown here, further measuring systems in addition to measuring system 30 are provided for testing the sheet material on transport medium 20. By suitably connecting a plurality of measuring systems one can for example reduce disturbances due to external magnetic fields. If required, partial components of a measuring system can also be mounted on the side of the transport medium where the sheet material is transported.

An explicit description of measuring system 30 is omitted since all currently known magnetic measuring systems can be used in the inventive apparatus. One can find examples of magnetic measuring systems in the above-mentioned prior art.

What is claimed is:

1. An apparatus for testing magnetic properties of sheet material such as bank notes or papers of value with a predetermined local resolution comprising:

at least one magnetic measuring system (30), and a transport medium (20) for guiding the sheet material (10) past the measuring system (30) at a measuring distance (21) defined between the sheet material (10) and the measuring system (30), characterized in that the transport medium (20) is disposed between the measuring system (30) and the sheet material (10), the measuring distance (21) is determined substantially by the thickness (22) of the transport medium, and the thickness (22) of the transport medium is smaller than the predetermined resolution.

2. The apparatus of claim 1, characterized in that the thickness (22) of the transport medium is equal to the measuring distance (21), and the transport medium (20) and measuring system (30) are designed to rub with a low coefficient of friction.

3. The apparatus of claim 1, characterized in that the measuring distance (21) is smaller than or equal to one half of the local resolution.

4. The apparatus of claim 1, characterized in that the measuring system (3) is covered in its entire width by the transport medium (20).

5. The apparatus of claim 1, characterized in that the measuring system (30) has at least the width of the sheet material (10).

6. The apparatus of claim 1, characterized in that the transport medium (20) is designed as a rotating drum (40).

7. The apparatus of claims 1, characterized in that the transport medium (20) is designed as a transport band (60).

8. The apparatus of claim 1, characterized in that the pressing band (50) is provided which has at least the width of the transport medium (20) and urges the sheet material (10) onto the transport medium (20).

9. The apparatus of claim 1, characterized in that a control measuring system (31) is provided for checking the soiling or attrition of the transport medium (20).

* * * * *